United States Patent [19]

Zaderej

[11] Patent Number: 4,868,706
[45] Date of Patent: Sep. 19, 1989

[54] PROTECTION CIRCUIT FOR A BATTERY CHARGER

[76] Inventor: George Zaderej, 444 S. Greenlawn Ave., South Bend, Ind. 46615

[21] Appl. No.: 140,583

[22] Filed: Jan. 4, 1988

[51] Int. Cl.$^4$ .......................................... H52H 3/087
[52] U.S. Cl. ..................................... 361/101; 361/93; 320/25; 320/33
[58] Field of Search ................... 361/87, 93, 100, 101, 361/15, 18; 320/25, 29, 32, 33

[56] References Cited

U.S. PATENT DOCUMENTS

| | | | |
|---|---|---|---|
| 3,816,804 | 6/1974 | Cardwell, Jr. ................... | 320/33 X |
| 4,086,524 | 4/1978 | Kremer ................................ | 320/33 |
| 4,233,553 | 11/1980 | Prince, Jr. et al. ............... | 320/32 X |

Primary Examiner—Derek S. Jennings
Attorney, Agent, or Firm—Rodger H. Flagg

[57] ABSTRACT

A protection circuit for a battery charger for safely charging a battery from a remote electrical power supply is disclosed. The protection circuit includes a power control means responsive to input from the remote power supply; an overload sensing means responsive to the power control means and to the negative polarity of the battery; a main switching means responsive to the overload sensing means and to the power control means wherein the main switching means controllably limits current output in the presence of a slight overload condition, and deactuates the battery charger in the presence of a large overload condition. An indicating means, such as a light emitting diode is preferably disposed between the power control means and the main switching means, to signal when the battery is being properly charged, and is deactuated when a short circuit occurs across the positive and negative terminals of the battery, or when the polarity is reversed at the battery terminals, or when the battery charger deactuates due to an overload condition.

20 Claims, 1 Drawing Sheet

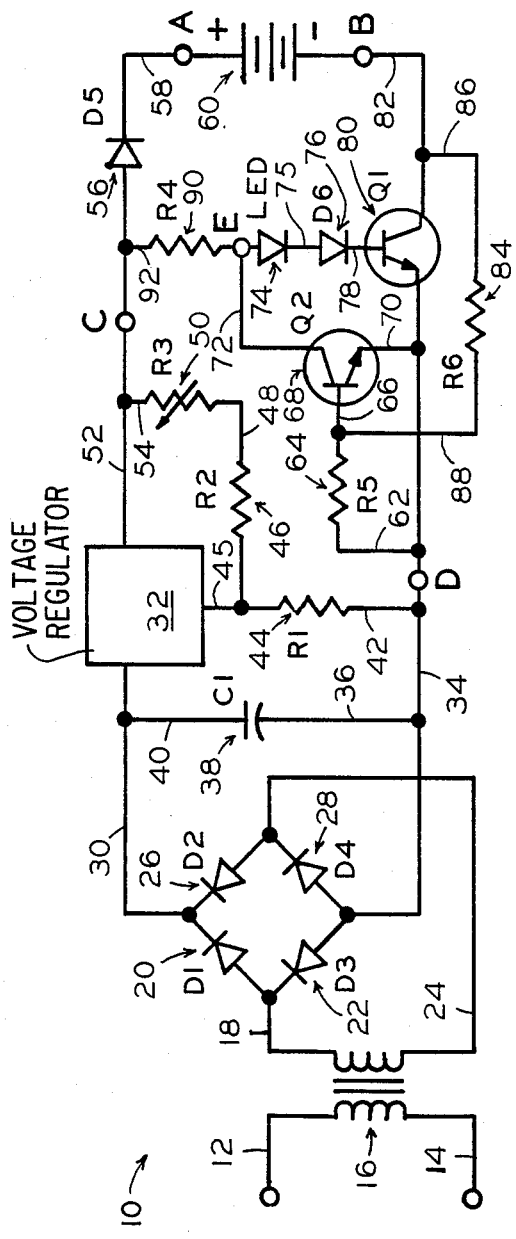

PROTECTION CIRCUIT FOR A BATTERY CHARGER

TECHNICAL FIELD

This invention relates to battery chargers, and more specifically to protection circuits for battery chargers providing a constant voltage trickle charge, while protecting against shorted or reversed leads, or an overload condition.

BACKGROUND OF THE INVENTION

Battery chargers utilizing an AC or DC electrical current to supply a controlled voltage to a battery are known in the art. Accidentally shorting the leads, or reversing the polarity of the leads may seriously damage the battery charger, or cause the electrolites in the battery to boil, damaging the battery. Protection circuits to prevent these events have been expensive, and often do not protect against both reversed polarity and shorted leads or an overload condition, while providing for a trickle charge to maintain batteries during storage, or between use as often needed for recreational vehicles, boats, battery storage, or the like.

DISCLOSURE OF THE INVENTION

The battery charger herein disclosed, is ideally suited to maintain a constant voltage trickle charge to a battery without overcharging. This battery charger will not be damaged from accidental shorting of the leads, or damaged by reversing polarity of the leads or by an overload condition. The present invention preferably includes an indicator means, such as a light, to indicate normal operation. The indicator means automatically turns off when the battery being charged reaches a selected load level.

BRIEF DESCRIPTION OF THE DRAWINGS

FIG. 1 is a schematic of the preferred embodiment of the constant voltage battery charger circuit.

FIG. 2 is an alternate embodiment of the battery charging circuit shown in FIG. 1.

FIG. 3 is a block diagram of the battery charging circuit.

BEST MODE FOR CARRYING OUT THE INVENTION

The subject matter which I regard as my invention is particularly pointed out and distinctly claimed in the claims. The structure and operation of my invention, together with further objects and advantages, may be better understood from the following description given in connection with the accompanying drawings, in which:

FIG. 1 is a schematic representation of the preferred embodiment of the constant voltage battery charger 10, wherein voltage from a remote power source (not shown) is supplied over lines 12, 14 to opposing ends of a transformer 16. It is within the scope of this invention to adapt this circuit for use with either AC or DC voltage.

Output 18 from transformer 16 passes to a forward biased diode 20 (D1) and to a reverse biased diode 22 (D3). Output 24 from transformer 16 passes to a forward biased diode 26 (D2) and to a reversed biased diode (D4) 28.

The forward biased diodes 20, 26 are electrically joined to conduct voltage over line 30 to Voltage Regulator 32. The reversed biased diodes 22, 28 are electrically joined to line 34. Line 36 connects line 34 with a forward biased capacitor 38 (C1). Line 40 connects capacitor 38 with line 30. Line 42 connects line 34 with a resistor 44 (R1). Line 45 connects the opposite end of resistor 44 with voltage Regulator 32. Line 45 also connects resistor 44 to resistor 46 (R2). The opposite end of resistor 46 is connected to a variable resistor 50 (R3) over line 48.

Voltage Regulator 32 provides an output signal over line 52 to a forward biased diode 56 (D5). The opposite end of variable resistance potentiometer 50 is connected to line 52 by line 54. A portion of line 52 is labeled "C," for future reference. The diode 56 is connected to the positive terminal of the battery 60 to be charged over line 58. The positive terminal of battery 60 is labeled "A" for future reference.

Line 34 is also connected by line 62 to resistor 64 (R5). A portion of line 34 is labeled "D", for future reference. The opposite end of resistor 64 is connected to the base of transistor 68 (Q2) by line 66. The emitter of transistor 68 is connected to line 34 by line 70. The collector of transistor 68 is preferably connected by line 72 to an indicating means 74, such as light emitting diode (LED), buzzer, or other known indicating means. A portion of line 72 is marked "E" for future reference. The indicating means 74 is connected by line 75 to a forward biased diode 76 (D6). If no indicating means 74 is used, line 72 passes directly to the forward biased diode 76.

The signal from diode 76 is connected by line 78 to the base of transistor 80 (Q1). The emitter of transistor 80 is connected to line 34. The collector of transistor 80 is connected by line 82 to the negative terminal of battery 60. The negative terminal of battery 60 is labeled "B" for future reference.

One end of resistor 84 (R6) is connected by line 86 to line 82. The opposite end of resistor 84 is connected by line 88 to line 66.

One end of resistor 90 (R4) is connected by line 92 to line 52. The opposite end of resistor 90 is connected to line 72.

An alternate embodiment of this invention is disclosed in FIG. 2, wherein the connection portions labeled "C" and "D" in FIG. 1 are modified as shown in FIG. 2. Line 52 at connection "C" passes to a forward biased diode 100 (D7). The output of diode 100 is connected over line 102 to the positive terminal of battery 60 labeled "A."

Line 34 at connection "D" is connected by line 104 to one end of resistor 106 (R8). The opposite end of resistor 106 is connected by line 108 to the base of transistor 110 (Q4). The emitter of transistor 110 is connected by line 112 to line 34. Line 34 also connects to the source portion of transistor 114 (Q3). The collector of transistor 110 is connected by lines 116, 118 to the base of transistor 114. Line 118 also connects to one end of resistor 120 (R7). The opposite end of resistor 120 is connected to line 52.

The drain of transistor 114 is connected by line 122 to the negative terminal of battery 60. One end of resistor 126 is connected by line 124 to line 108. The opposite end of resistor 126 is connected by line 128 to line 122.

Referring now to FIG. 3, electrical power is supplied from a remote source (not shown) to a power control means 130. Output from 130 is connected by line 131 to the indicator means 132. Line 133 connects line 131 to the overload sensing means 134, which controls switching means "E" and "D.". Overload sensing means 134 also senses an overload condition at "B" and "D."

The indicator means block 132 sends an output signal over line 135 to main switching means block 136, which controls switching connection means, "B" and "D." Main switching means 136 sends a signal over line 137 to line 139. Line 140 connects Overload Sensing Means 134 to the negative terminal of battery 60 labeled "B." Line 140 also connects the Main Switching Means 136 to the negative battery terminal "B" of battery 60. The input to the power control means 130 is connected at "C" to the positive terminal "A" of the battery 60.

The individual components in one practically proven embodiment of the type shown in FIG. 1, have the following preferred values:

Transformer 16; 120 VAC primary input to 15 VAC. 600 MA secondary output.
  Diodes 20, 22, 26, 28 56.76; IN4001.
  Voltage Regulator 32; 5 volt, 1 amp LM 7805.
  Potentiometer 50; 250 ohm.
  Transistor 68; NPN 2N2222.
  Transistor 80; NPN TIP41C.
  Capacitor 38; 47 uf/35 VDC.
  Resistor 44; ¼W 470 ohm ± 5%.
  Resistor 46; ¼W, 330 ohm ± 5%.
  Resistor 90; ¼W, 680 ohm ± 5%.
  Resistor 64; ¼W, 470 ohm ± 5%.
  Resistor 84; ¼W, 2.4 Kohm ± 5%.

The selected components referenced above will provide a constant voltage charging circuit suitable for maintaining a battery in fully charged condition during storage, such as needed in the recreation vehicle and boating industries. One skilled in this art, with the aid of this disclosure may readily substitute other components to increase or decrease the charging capacity to suit other known needs and such changes are intended to fall within the scope of the accompanying specification and claims.

In operation of the invention shown in FIG. 1, leads 58 and 82 of the battery charger are connected to terminal "A" and "B," respectively of battery 60. Should a short accidentally occur, or should lead 58 be inadvertently connected to terminal "B" instead of terminal "A," the charger disclosed herein will turn off, without damage to the battery or to the battery charger 10. In the event that battery charger 10 leads are shorted or when the polarity of the leads 58, 82 are reversed, indicator means 74 will turn off, providing the user with an indication that the battery is not being properly charged. Upon investigation by the user, the short or crossed wiring should be readily detected and corrected, whereupon the indicator means will turn on showing that the battery is now being safely charged.

In normal operation, output from voltage regulator 32 at connection "C" supplies voltage to resistor 90, actuating transistor Q1, which allows battery charger 10 to conduct voltage to battery terminal "A" to charger battery 60.

Where the battery 60 to be charged represents a large overload condition, which results in a high current draw from the battery charger, resistors 64 and 84 are selected so that transistor 68 will turn on. When transistor 68 is actuated, resistor 90 is shorted and transistor 80 is inactuated, which turns off the battery charger 10.

Where the battery 60 to be charged represents a slight overload condition, which results in a moderate current draw from the battery charger, transistor 68 is partially actuated, which reduces current through resistor 90 causing transistor 80 to enter a current limiting mode enabling the battery 60 to remain charging.

By decreasing the value of resistor 84, sensitivity is increased. Therefore, current overload may be adjusted to limit current output to a desired level, while allowing the battery to remain charging while in the current limiting mode.

Although this invention has been illustrated and disclosed with reference to a preferred embodiment, it is to be understood that modifications may be made without departing from the spirit of the invention or from the scope of the following claims.

INDUSTRIAL APPLICABILITY

The present invention may be utilized in battery chargers and trickle chargers for use in supplying electrical power to a battery, while protecting against shorted or reversed leads.

I claim:

1. An improved protection circuit for a battery charger, for safely charging a battery from a remote power supply, which comprises:
   (a) a power control means responsive to input from the remote power supply, and to a positive polarity from the battery to be charged;
   (b) and overload sensing means responsive to the power control means, and to a negative polarity from the battery to be charged;
   (c) a main switching means responsive to the overload sensing means, to the power control means, and to the negative polarity of the battery to be charged to controllably limit the current output of the battery charger in the presence of a slight overload condition, and to deactuate the battery charger in the presence of a large overload condition.

2. The circuits of claim 1, wherein an indicating means is in electrical communication with the power control means and the main switching means and is responsive to proper connection between the battery charger and the battery.

3. The circuit of claim 2, wherein the indicating means is a light emitting diode which is actuated upon proper connection between the battery charger and the battery, and deactuated when a short occurs across positive and negative terminals of the battery.

4. The circuit of claim 2, wherein the indicating means is actuated when the battery charger is properly connected to the battery and is deactuated when the battery being charged reaches a selected load level.

5. The circuit of claim 2, wherein the indicating means and the battery charger are deactuated when a short occurs across the negative and positive terminals of the battery to be charged.

6. The circuit of claim 2, wherein the indicating means and the battery charger are deactuated when the polarity is reversed between the battery charger and the positive and negative terminals of the battery to be charged.

7. The circuits of claim 1, wherein a first transistor has an emitter in electrical communication with an emitter of a second transistor, and the first and second transistors are disposed within the battery charger circuit to deactuate the battery charger in the presence of a large overload condition.

8. The circuit of claim 1, wherein the circuit comprises a constant voltage charging circuit suitable for maintaining a battery in a fully charged condition during storage, while the battery charger circuit controllably limits the current output of the battery charger in the presence of a slight overload condition, and deactuates the battery charger circuits in the presence of a large overload condition.

9. The circuit of claim 7, wherein a resistor is disposed between a base lead from the first transistor and a collector lead from the second transistor, and the resistor's value is decreased to controllably increase the sensitivity of the circuit to adjust current overload while allowing the battery to remain charging while in a current limiting mode.

10. The circuits of claim 7, wherein the first transistor is an NPN transistor, and the second transistor is a field effect transistor.

11. An improved protection circuit for a battery charger, for safely charging a battery from a remote power supply, which comprises:
 (a) a power control means responsive to input from the remote power supply, and to a positive polarity from the battery to be charged;
 (b) and overload sensing means responsive to the power control means, and to a negative polarity from the battery to be charged;
 (c) a main switching means responsive to the overload sensing means, the power control means, and to the negative polarity of the battery to be charged to controllably limit the current output of the battery charger in the presence of a slight overload condition, and to deactuate the battery charger in the presence of a large overload condition; and
 (d) an indicating means in electrical communication with the power control means and the main switching means, wherein the indicating means is responsive to a proper connection between the battery charger and the battery.

12. The circuit of claim 11, wherein the indicating means is a light emitting diode which is actuated upon proper connection between the battery charger and the battery, and deactuated when a short occurs across positive and negative terminals of the battery.

13. The circuit of claim 11, wherein the indicating means is actuated when the battery charger is properly connected to the battery and is deactuated when the battery being charged reaches a selected load level.

14. The circuit of claim 11, wherein the indicating means and the battery charger are deactuated when a short occurs across the negative and positive terminals of the battery to be charged.

15. The circuit of claim 11, wherein the indicating means and the battery charger are deactuated when the polarity is reversed between the battery charger and the positive and negative terminals of the battery to be charged.

16. The circuit of claim 11, wherein a first transistor has an emitter in electrical communication with an emitter of a second transistor, the first and second transistor disposed within the battery charger circuit to deactuate the battery charger in the presence of a large overload condition.

17. The circuit of claim 16, wherein the first transistor is an NPN transistor, and the second transistor is a field effect transistor.

18. The circuit of claim 11, wherein a resistor is disposed between a base lead from the first transistor and a collector lead from the second transistor, and the resistor's value is decreased to controllably increase the sensitivity of the circuit to adjust current overload while allowing the battery to remain charging while in a current limiting load, while the first transistor is actuated in the presence of a large overload condition, which acts to deactuate the second transistor, which turns off the battery charger.

19. An improved protection circuit for a battery charger, for safely charging a battery from a remote power supply, which comprises:
 (a) a power control means responsive to input from the remote power supply, and to a positive polarity from the battery to be charged;
 (b) an overload sensing means responsive to the power control means, and to a negative polarity from the battery to be charged;
 (c) a main switching means responsive to the overload sensing means, the power control means, and to the negative polarity of the battery to be charged; the main switching means further comprising at least one resistor whose value is decreased to increase circuit sensitivity to adjust current overload to limit current output in the presence of a slight overload condition, and a first and second transistor with emitters electrically joined, the first and second transistors disposed within the circuit to deactuate the circuit in the presence of a large overload condition; and
 (d) an indicator means in electrical communication with the power control means and the main switching means, wherein the indicating means is responsive to a proper connection between the battery charger and the battery.

20. The circuit of claim 19, wherein the indicating means is a light emitting diode which is actuated upon the proper connection between the battery charger and the battery, and deactuated when the battery being charged reaches a selected load level, or when a short occurs across the negative and positive terminals of the battery to be charged, or when the polarity is reversed between the battery charger and the positive and negative terminals of the battery.

* * * * *